J. GORE.
Harvester.
No. 1,129. Reissued Jan. 15, 1861.
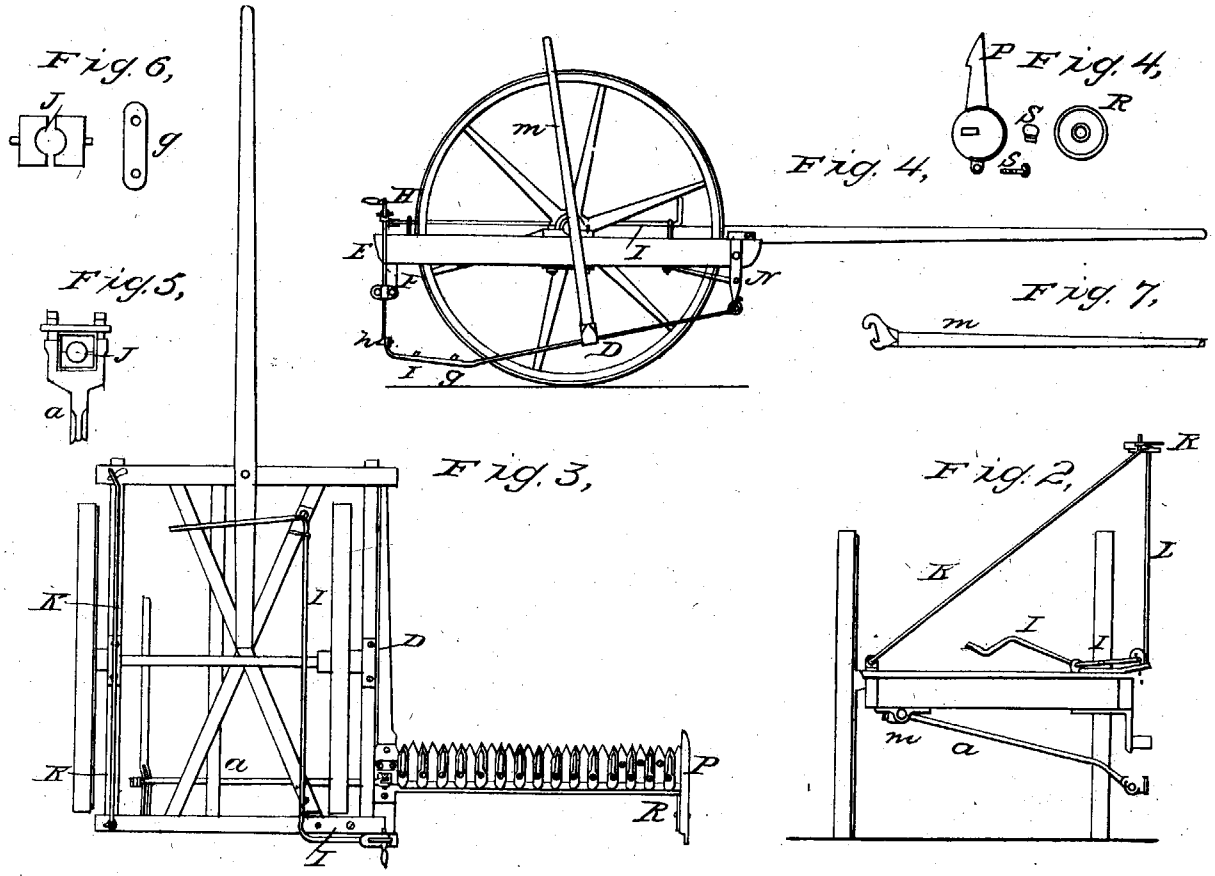
Witnesses:
J. G. Clayton
Jos. C. Clayton
Inventor
John Gore
N. PETERS, Photo-Lithographer, Washington, D. C.

UNITED STATES PATENT OFFICE.

JOHN GORE, OF BRATTLEBOROUGH, VERMONT.

IMPROVEMENT IN HARVESTERS.

Specification forming part of Letters Patent No. 25,582 dated December 27, 1859; Reissue No. 1,129, dated January 15, 1861.

*To all whom it may concern:*

Be it known that I, JOHN GORE, of Brattleborough, Windham county, State of Vermont, have invented certain new and useful Improvements in Grain and Grass Harvesters; and I do hereby declare that the following is a full and exact description thereof, reference being had to the accompanying drawings, and to the letters of reference marked thereon.

Figure 1 is a side elevation. Fig. 2 is a rear end view. Fig. 3 is a plan view. Fig. 4 is a view of the shoe P, wheel R, screw S, and thimble S′. Fig. 5 is a view of the journal-box J, attached to rod *a*; Fig. 6, the revolving journal-box J and cap J′, by which it is attached to connecting-rod *a*. Fig. 7 is the hand-lever M′ detached.

To enable those skilled in the art to make and use my invention, I will describe its construction and operation.

In the construction of my invention in Fig. 1, D is the oscillating draw-bar of the cutting apparatus. E is the curved guide to which the bent foot-lever is connected for raising or lowering the cutter-bar; F, lower guide or bearing; H, the upper guide or bearing; I, the foot-lever for operating the segment or curved guide E, and by it elevating the cutters; N, the hook on which draw-bar D turns.

In Fig. 2, M is the rear end bearing of the crank-shaft; K, the brace for holding up the cutter-bar and cutters when elevated, as shown at L, when it is required to move the machine without cutting.

In the operation of my invention, having constructed it as above, the cutter-bar, with the cutters, is attached to D by the screws *g g*. It will be seen that by depressing the foot-lever I the segment E is elevated, raising with it the cutter-bar and cutters attached to it. By this arrangement the inner end of the cutter-bar can be raised and adjusted to any desired height by means of the pin and holes. The outer end can be operated by the hand-lever M′. The cutter-bar and cutters can be raised in two directions. By pressing on the lever I the inner end of the cutter-bar is raised directly in a vertical direction, and by operating the hand-lever M′ the cutter-bar and cutters are raised or lowered at the outer end, as may be found necessary in passing over obstructions, or in cutting on hillsides or depressions. The cutters by this arrangement can be made to cut in any position required, and by means of the oscillating bar D, which is hung on hook N in front, and to segment E in the rear by a screw-pivot, *h*, the cutters, being attached to this bar, can be elevated entirely out of the way, as shown in Fig. 2, so that the machine can be removed to any part of the field.

It will be seen that if the connecting-rod *a*, which is attached to the crank-shaft, operated in a stationary box or bearing it would be twisted in raising the cutters; but to overcome this I have made a journal-box, as seen in Figs. 5 and 6. This journal-box has pivot-bearings which allow it to turn to accommodate itself to the raising or lowering of the end of the connecting-rod without twisting or binding the rod in its movement.

The segment E is in the arc of a circle swept from the crank-shaft, and serves to support the cutting apparatus at the heel of the draw-bar D. By means of the segment E, I can raise the heel of the cutter-bar to any required height. This segment is held in position as required by a pin let through it.

Having thus fully described the construction and operation of my invention, what I claim as new, and desire to secure by Letters Patent, is—

1. The use of the lever M′, constructed as described, in combination with the tapering draw-bar D for elevating the cutting apparatus of harvesters, in the manner described.

2. The adjustable box J, constructed as described, in combination with the connecting-rod *a* and cutting apparatus, and operating as set forth.

JOHN GORE.

Witnesses:

THOS. T. SEEDEN,

JOS. C. CLAYTON.